United States Patent
Subramanian (10) Patent No.: US 12,090,985 B2
(45) Date of Patent: Sep. 17, 2024

(54) METHOD FOR DETECTING A FAILURE IN A VEHICLE PNEUMATIC SYSTEM

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 261 days.

(21) Appl. No.: 17/862,523

(22) Filed: Jul. 12, 2022

(65) Prior Publication Data
US 2023/0029704 A1 Feb. 2, 2023

(30) Foreign Application Priority Data
Jul. 29, 2021 (EP) .................................... 21188514

(51) Int. Cl.
*B60T 8/88* (2006.01)
*B60T 17/22* (2006.01)
*G01M 3/26* (2006.01)

(52) U.S. Cl.
CPC .............. *B60T 8/885* (2013.01); *B60T 17/22* (2013.01); *G01M 3/26* (2013.01); *B60T 2270/406* (2013.01)

(58) Field of Classification Search
CPC .... B60T 8/885; B60T 17/22; B60T 2270/406; G01M 3/26
See application file for complete search history.

(56) References Cited

U.S. PATENT DOCUMENTS

| | | | |
|---|---|---|---|
| 2020/0010061 | A1 | 1/2020 | Tiwari et al. |
| 2020/0139952 | A1 | 5/2020 | Van Thiel |

FOREIGN PATENT DOCUMENTS

| | | |
|---|---|---|
| CN | 108715163 A | 10/2018 |
| CN | 110633792 A | 12/2019 |
| CN | 111272412 A | 6/2020 |

OTHER PUBLICATIONS

European Search Report for European Patent Application No. 21188514.0, completed Jan. 10, 2022, 4 pages.

*Primary Examiner* — Jelani A Smith
*Assistant Examiner* — Nada Mahyoob Alqaderi
(74) *Attorney, Agent, or Firm* — Withrow & Terranova, PLLC (57) ABSTRACT

Method for detecting a failure in a pneumatic system of a vehicle, the pneumatic system comprising a supply pneumatic subsystem comprising supply lines, a control pneumatic subsystem comprising control lines, a delivery pneumatic subsystem comprising delivery lines, the vehicle comprising an electronic control unit configured to implement a trained supply recurrent neural network, a trained control recurrent neural network, a trained delivery recurrent neural network, and a trained main recurrent neural network; the method comprising collect and provide the input parameters to the trained recurrent neural networks to get a output from recurrent neural networks; provide the input parameters and the output parameters from recurrent neural networks to get a main output indicative of a pneumatic system health parameter indicative of a presence or an absence of a failure in one of the supply pneumatic subsystem, or the control pneumatic subsystem, or the delivery pneumatic subsystem of the pneumatic system.

6 Claims, 3 Drawing Sheets

METHOD FOR DETECTING A FAILURE IN A VEHICLE PNEUMATIC SYSTEM

RELATED APPLICATIONS

The present application claims priority to European Patent Application No. 21188514.0, filed on Jul. 29, 2021, and entitled "METHOD FOR DETECTING A FAILURE IN A VEHICLE PNEUMATIC SYSTEM," which is incorporated herein by reference in its entirety.

TECHNICAL FIELD

This invention relates to the field of braking system.

BACKGROUND

It is known to use pneumatic circuits to deliver pressured air to the brakes of a vehicle. It is also known to use such pneumatic circuits for suspension system.

Braking system is a safety concern and leaks in the braking system could be severely dangerous. Therefore, there is a need to detect leaks accurately in the pneumatic circuits, in particular in the pneumatic braking circuits, of a vehicle.

SUMMARY OF THE INVENTION

To that end, the present invention provides a method for detecting a failure in a pneumatic system of a vehicle, the pneumatic system comprising:
- a supply pneumatic subsystem comprising supply lines, at least one supply line being in fluid communication with a pressure source on one end and with a control valve on another end, other supply lines being in fluid communication with the pressure source on one end and with a relay valve on another end;
- a control pneumatic subsystem comprising control lines, each control line being in fluid communication with the control valve on one end and with one of the relay valves;
- a delivery pneumatic subsystem comprising delivery lines, each delivery line being in fluid communication with one of the relay valves on one end, and with a brake on the other end;
- the vehicle comprising an electronic control unit, configured to collect a set of input parameters from sensors via a communication bus of the vehicle, and configured to implement a trained supply recurrent neural network, a trained control recurrent neural network, a trained delivery recurrent neural network, and a trained main recurrent neural network;
- the input parameters comprising supply input parameters relative to the supply pneumatic subsystem, control input parameters relative to the control pneumatic subsystem, and delivery input parameters relative to, the delivery pneumatic subsystem;
- the sensors comprising:
- supply sensors, configured to collect supply input parameters;
- control sensors, configured to collect control input parameters;
- delivery sensors, configured to collect delivery input parameters;
- the method comprising the following steps:
- collect, during a first period of time, supply parameters from the supply sensors;
- provide the supply parameters as input to the trained supply recurrent neural network to get a supply output from the supply recurrent neural network;
- collect, during a second period of time, control parameters from the control sensors, the second period of time being during a brake application requested by pedal;
- provide the control parameters as input to the trained control recurrent neural network to get a control output from the control recurrent neural network;
- collect, during a third period of time, delivery parameters from the delivery sensors, the third period of time being during a brake application requested by pedal or requested electronically;
- provide the delivery parameters as input to the trained delivery recurrent neural network to get a delivery output from the delivery recurrent neural network;
- provide, as input to the trained main recurrent neural network, the supply parameters, the control parameters, the delivery parameters, the supply output, the control output, and the delivery output, to get a main output indicative of a pneumatic system health parameter, the pneumatic system health parameter being indicative of a presence and a severity, or of an absence, of a failure in one of the supply pneumatic subsystem, or the control pneumatic subsystem, or the delivery pneumatic subsystem of the pneumatic system.

According to an embodiment, the invention comprises one or more of the following features, alone or in any combination technically compatible.

According to an embodiment, the failure is one of a leak, a kink, a broken valve, said failure being present in the supply pneumatic subsystem, or in the control pneumatic subsystem, or in the delivery pneumatic subsystem.

According to an embodiment, the severity is defined according to a scale, preferably from one to five.

According to an embodiment, the pneumatic system health parameter is indicative of the presence and the severity of a failure in one of the supply pneumatic subsystem, or the control pneumatic subsystem, or the delivery pneumatic subsystem of the pneumatic system, and of the presence and the severity of another failure in another one of the supply pneumatic subsystem, or the control pneumatic subsystem, or the delivery pneumatic subsystem of the pneumatic system.

According to an embodiment, the set of input parameters comprise at least:
- a brake pedal position measured by a pedal position sensor,
- an ambient temperature measured by an ambient temperature sensor placed on the vehicle,
- a delivery pressure measured by a delivery pressure sensor in delivery lines
- a control pressure measured by a control pressure sensor in control lines
- a supply pressure measured by a supply pressure sensor in supply lines
- an air pressure measured in a air pressure sensor in an air pressure modulator unit
- electronic messages sent on a communication bus to apply brake electronically
- a compressor status and information.

According to an embodiment, a compressor information comprises an output pressure and an output temperature of the compressor, and a compressure status is indicative of whether the compressor is working or not working.

According to an embodiment, the set of input parameters further comprises:

a brake pedal velocity
suspension information
load transfer information
transmission airline information
a supply lines temperature in supply lines and/or a delivery lines temperature in delivery lines and/or a control lines temperature in control lines.

According to an embodiment, suspension information comprise at least one of a current suspension air bag pressure, a required suspension air bag pressure, a ride height.

According to an embodiment, load transfer information comprise information on the load transferred from one axle of the vehicle to another axle of the vehicle during driving.

According to an embodiment, transmission airline information comprise a gear selected, a new requested gear, pressure in an air line of the vehicle and requested pressure in the air line of the vehicle.

According to an embodiment, the steps of the method are repeated at least one more time when the pneumatic system health parameter is indicative of the presence of a failure, in order to double-check an occurrence of the failure.

According to an embodiment, the method further comprises a training phase of an untrained supply recurrent neural network, an untrained control recurrent neural network, a untrained delivery recurrent neural network, and an untrained main recurrent neural network, to provide the trained supply recurrent neural network, the trained control recurrent neural network, the trained delivery recurrent neural network, and the trained main recurrent neural network, the training phase comprising the following steps:
train the untrained supply recurrent neural network to provide the trained supply recurrent neural network, the training of the untrained supply recurrent neural network comprising providing as input to the untrained supply recurrent neural network at least one set of supply input parameters collected during a first training time period and manually labeling an supply output parameter according to a presence and a severity, or to an absence, of an actual failure in the supply pneumatic subsystem;
train the untrained control recurrent neural network to provide the trained control recurrent neural network, the training of the untrained control recurrent neural network comprising providing as input to the untrained control recurrent neural network at least one set of control input parameters collected during a second training time period, and manually labeling a control output parameter according to a presence and a severity, or to an absence, of an actual failure in the control pneumatic subsystem, said second training time period being during a brake application requested by pedal;
train the untrained delivery recurrent neural network to provide the trained delivery recurrent neural network, the training of the untrained delivery recurrent neural network comprising providing as input to the untrained delivery recurrent neural network at least one set of delivery input parameters collected during a third training time period, and manually labeling a delivery output parameter according to a presence and a severity, or to an absence, of an actual failure in the delivery pneumatic subsystem, said third training period of time being during a brake application requested by pedal or requested electronically;
train the untrained main recurrent neural network to provide the trained main recurrent neural network,
the training of the untrained main recurrent neural network comprising the following steps:
provide at least one other set of supply input parameters collected during another first training time period to the trained supply recurrent neural network, and
provide at least one other set of control input parameters collected during another second training time period to the trained control recurrent neural network, the other second training time period being during another brake application requested by pedal, and
provide at least one other set of delivery input parameters collected during another third training time period to the trained delivery recurrent neural network, the other third training time period being during another brake application requested by pedal or requested electronically;
provide as input to the untrained main recurrent neural network:
the at least one other set of supply input parameters, and
the at least one other set of control input parameters, and
the at least one other set of delivery input parameters, and
a supply output of the trained supply recurrent neural network, and
a control output of the trained control recurrent neural network, and
a delivery output of the trained delivery recurrent neural network, and
manually label an main output parameter of the untrained main recurrent neural network according to a presence and a severity, or to an absence, of an actual failure in one of the supply pneumatic subsystem, and/or the control pneumatic subsystem and/or the delivery pneumatic subsystem.

According to an aspect, the invention also relates to a vehicle comprising a pneumatic system, and an electronic control unit, the pneumatic system comprising:
a supply pneumatic subsystem comprising supply lines, at least one supply line being in fluid communication with a pressure source on one end and with a control valve on another end, other supply lines being in fluid communication with the pressure source on one end and with a relay valve on another end;
a control pneumatic subsystem comprising control lines, each control line being in fluid communication with the control valve on one end and with one of the relay valves;
a delivery pneumatic subsystem comprising delivery lines, each delivery line being in fluid communication with one of the relay valves on one end, and with a brake on the other end;
the electronic control unit being configured to collect a set of input parameters from sensors via a communication bus of the vehicle, and configured to implement a trained supply recurrent neural network, a trained control recurrent neural network, a trained delivery recurrent neural network, and a trained main recurrent neural network
the input parameters comprising supply input parameters relative to the supply pneumatic subsystem, control input parameters relative to the control pneumatic subsystem, and delivery input parameters relative to, the delivery pneumatic subsystem;
the sensors comprising:
supply sensors, configured to collect supply input parameters;
control sensors, configured to collect control input parameters;

delivery sensors, configured to collect delivery input parameters;

the electronic control unit being configured to implement the method according to any of the preceding claims.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which the same reference refer to similar elements or to elements having similar functions, and in which.

DETAILED DESCRIPTION

Figure 1:
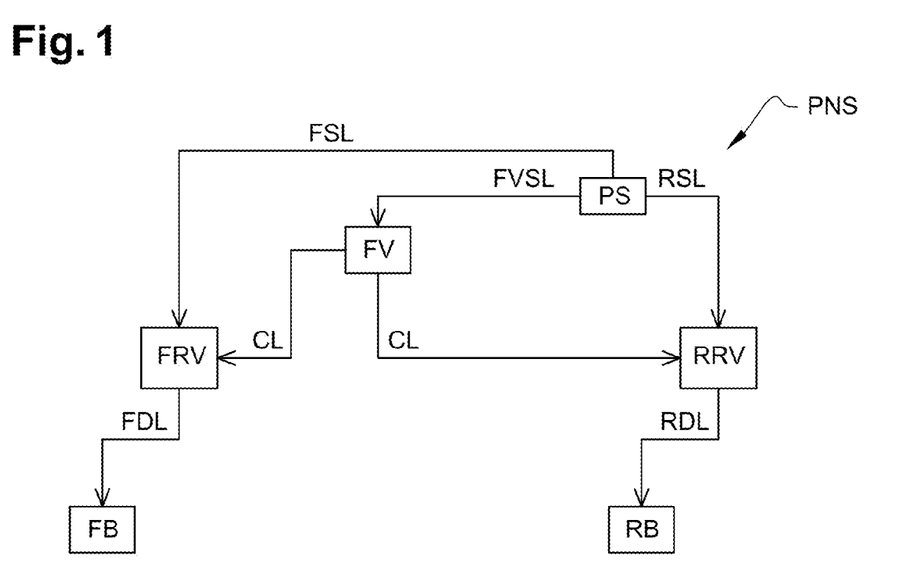
FIG. 1 represents schematically the pneumatic system of a vehicle braking system.

In reference to FIG. 1, the main components of a pneumatic system PNS of a braking system of a vehicle is described hereinafter. The pneumatic system PNS comprises usually three pneumatic lines:

at least one supply line connected to a pressure source PS, such as an air tank; for example, there may be a primary, or a front supply line PSL, configured to supply a front brake FB, via a front relay valve FRV, with pressured air, and a secondary, or rear supply line RSL, configured to supply a rear brake RB, via a rear relay valve RRV, with pressured air. Another supply line FVSL is configured to supply a control valve FV, for example a foot valve FV configured to be activated by a pedal actioned by a foot of the driver of the vehicle;

front and rear delivery lines FDL, RDL are connected at one end to the output ports, or delivery ports, of the relay valves FRV, RRV, and at the other end to the brakes FB, RB and configured to deliver pressure required by the brakes to develop the braking force based on the pressure delivered by the delivery lines;

control lines CL are configured to connect the control valve CV to the control ports of the relay valves FRV, RRV; the relay valves FRV, RRV are provided with a supply port to which a supply line is connected to supply pressure, and with a delivery port to which a delivery line FDL, RDL is connected; the relay valves FRV, RRV are also provided with a control port to which a control line CL is connected to supply a control pressure; the supplied pressure supplied at the supply port of one of said relay valves FRV, RRV is delivered totally or partially to the delivery port of said relay valve FRV, RRV, when the said relay valve FRV, RRV is open, totally or partially, based on the control pressure supplied by the control line. The control valve CV also has a supply port and a delivery port, but the control port of the foot valve is not pneumatic but is mechanically connected to a control pedal, activated usually by a foot of the driver.

A position of the control pedal, determines the control pressure in the control lines. The foot brake module, comprising the foot pedal, and the control valve CV, also comprises a position sensor to provide information on the driver demand. A pressure sensor in the control lines may also provide information on the driver demand, but with limited accuracy compared to the foot pedal position sensor.

Hence, the delivery from the foot valve is the control line for the front relay valve FRV and rear relay valve RRV. A relay valve FRV, RRV has a supply port where the supply line is connected from the tank and the control port is connected to the control line coming from the delivery of the control valve CV and the delivery ports of the relay valve FRV, RRV are connected to the wheel end chamber which converts pneumatic pressure to mechanical force that needs to be applied against the rotors for braking force.

Suspension system may also be using pneumatics in air suspension arrangement. Then, load transfer from rear axle to front axle, or vice-versa, related to vehicle pitch, nose of the vehicle diving or leaning back, and the impact of air suspension pressured lines to maintain ride height, either lowering pressure or increasing pressure, should be taken into account in the modelling of the pneumatic circuits.

Therefore, the vehicle pneumatic system PNS considered in the invention may not only be configured to contribute to the braking function but also to the suspension function of the vehicle.

Optionally, the relay valves FRV, RRV described above may be electronically controlled relay valves. In that case, the control port of the relay valves is electronically controlled, and is therefore provided, for example with solenoids configured to receive electronic signal, so that depending on the electronic signal received, the control port is totally or partially opened to send pressure from supply port to delivery port of the relay valve FRV, RRV. Thus, the electronic signal will be based on the required pressure at the brakes FB, RB. In order to implement a closed-loop control of the pressure in the delivery side of the relay valve FRV, RRV, the relay valves FRV, RRV are provided with a pressure sensor configured to measure the pressure at the delivery port.

Supply lines PSL, RSL are also provided with pressure sensors configured to measure the pressure in the supply lines PSL, RSL.

Supply ports may optionally also be provided with pressure sensors.

An electronic control unit ECU of the vehicle, or a virtual electronic control unit inside an existing control unit, is configured to receive input parameters measured by sensors provided with the pneumatic system, and transmitted to the electronic control unit ECU via an electronic communication bus of the vehicle, such as a CAN BUS; said input parameters are thus provided as inputs for a machine learning model, such as a neural network model of the pneumatic system, and finally retrieve pneumatic health parameter PHP as an output parameter of the neural network model; the output parameter is transmitted, via the communication bus, to multiple electronic control units, such as, for example, a braking electronic control unit BECU, and/or a suspension electronic control unit SECU, and/or a cluster electronic control unit CECU, to warn the driver; of course, the transmission of the output parameter could be extended to all electronic control units connected to the communication bus network. The neural network model of the pneumatic system is configured so that, after appropriate training of the neural network model, the output parameter, i.e. the pneumatic health parameter, is indicative of the presence or of the absence of a failure in the pneumatic system, such as leak, or a kink; if presence of a failure is indicated by the output parameter of the trained neural network, more information is predicted with the output parameter, indicating if the failure is kink, or a fitting leakage, or an open port, or a clogged port.

Figure 2:
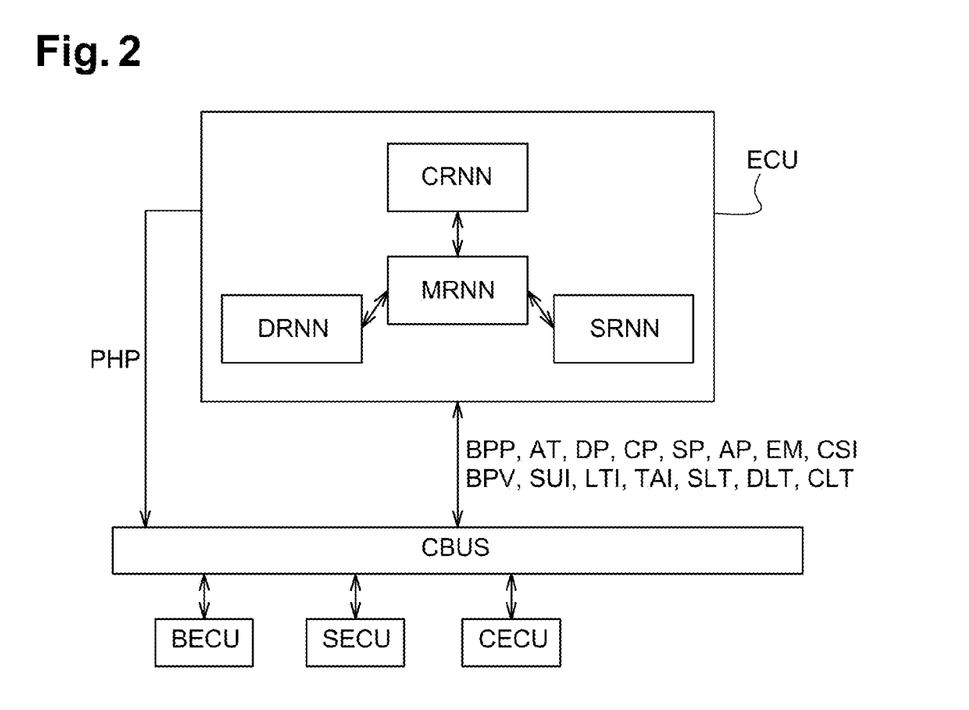
FIG. 2 represents a neural network modelling of the pneumatic circuits of a vehicle braking system.

The electronic control unit of the vehicle is configured to implement a neural network model of the pneumatic system of the vehicle, said neural network model comprising:
- a control recurrent neural network CRNN of the control lines CL, and
- a supply recurrent neural network SRNN of the supply lines FSL, RSL, FVSL, and
- a delivery recurrent neural network DRNN of the delivery lines FDL, RDL, and
- a main recurrent neural network MRNN.

The input parameters may include at least the following, but is not limited to the following:
- a brake pedal position BPP measured by a pedal position sensor
- an ambient temperature AT measured by an ambient temperature sensor placed on the vehicle,
- a delivery pressure DP measured by a delivery pressure sensor in delivery lines
- a control pressure CP measured by a control pressure sensor in control lines
- a supply pressure SP measured by a supply pressure sensor in supply lines
- an air pressure AP measured in a air pressure sensor in an air pressure modulator unit
- electronic messages EM sent on a communication bus to apply brake electronically
- a compressor status and information CSI.

For example, a compressor information comprises an output pressure and an output temperature of the compressor, and a compressure status is indicative of whether the compressor is working or not working.

Optionally, the input parameters may also include one of the following parameters:
- Brake pedal velocity BPV
- Suspension information SUI
- Load transfer information LTI
- Transmission airline information TAI
- Supply lines temperature SLT in supply lines FSL, RSL, FVSL and/or delivery lines temperature DLT in delivery lines FDL, RDL and/or control lines temperature CLT in control lines CL.

For example, suspension information comprise at least one of a current suspension air bag pressure, a required suspension air bag pressure, a ride height.

For example, load transfer information comprise information on the load transferred from one axle of the vehicle to another axle of the vehicle during driving.

For example, transmission airline information comprise a gear selected, a new requested gear, pressure in an air line of the vehicle and requested pressure in the air line of the vehicle.

The sensors collecting input parameters comprise:
- supply sensors, placed on, and configured to collect, during a first period of time, input parameters relative to, the supply pneumatic subsystem comprising the supply lines FSL, RSL, FVSL;
- control sensors, placed on, and configured to collect, during a second period of time, input parameters relative to, the control pneumatic subsystem comprising control lines CL; said second period of time is triggered by brake pedal actuation;
- delivery sensors, placed on, and configured to collect, during a third period of time, input parameters relative to, delivery pneumatic subsystem comprising delivery lines FDL, RDL; said first period of time is triggered by brake pedal actuation or by brake electronic request.

The supply recurrent neural network SRNN, the control recurrent neural network CRNN, and the delivery recurrent neural network DRNN, receive input parameters collected respectively from the supply sensors, configured to collect information relative to the supply pneumatic subsystem, the control sensors, configured to collect information relative to the control pneumatic subsystem, or the delivery sensors configured to collect information relative to the delivery pneumatic subsystem; when it has been appropriately trained, each of the supply recurrent neural network SRNN, the control recurrent neural network CRNN, and the delivery recurrent neural network DRNN, is configured to predict an output indicative of a possible failure of the corresponding pneumatic subsystem.

The main recurrent neural network MRNN is configured to receive the output of the other recurrent neural network CRNN, DRNN, SRNN, and the input collected by both the supply sensors, the control sensors, and the delivery sensors. When it has been trained appropriately, the main recurrent neural network MRNN is configured to predict the pneumatic health parameter PHP, indicative of the presence or of the absence of a failure, such as leak, or a kink or a broken valve for example, and to predict where in the whole pneumatic system the failure is present; based on the different combination of the failures predicted by the other recurrent neural network CRNN, DRNN, SRNN, and based on the input parameters collected during a period of time by the supply sensors, the control sensors, and the delivery sensors the main neural model MRNN is configured to classify which line has a problem and if that pneumatic line has a leak or a kink or a broken valve.

According to an embodiment of the method according to the invention, when one of the other recurrent neural network CRNN, DRNN, SRNN predicts a failure of the corresponding pneumatic line, the main recurrent neural network MRNN switches to a verification mode to double check this prediction.

Each of the recurrent neural network CRNN, DRNN, SRNN and the main neural network model MRNN will be trained through extensive set of training data which is manually truth labelled. For example, a kink or a broken valve is created in the front delivery line and input parameters are collected and output is manually labelled accordingly. The testing scenario for each recurrent neural network CRNN, DRNN, SRNN, MRNN is determined based on its working scenario. For example, the control recurrent neural network 1 CRNN will only receive signals and start monitoring whenever brake is applied. Therefore, the test scenario is when the brake pedal position is>0 and the test scenario ends when the brake pedal position=0. Within this period, the pressure gradient is the data from the necessary sensors.

A training algorithm example is described below for each neural network model.

Training algorithm of control recurrent neural network CRNN:
A. Check if Brake Pedal is greater than 0,
  a) YES
    Start recording data
      B. Check if Pedal==0
        1. NO:
          a. Keep recording
        2. YES
          a. Signal Processing
          b. Cutting the data into useful pieces
          c. Create necessary additional features
          d. Prepare signals and calculated features for input to the control recurrent neural network CRNN
          e. Input to the control recurrent neural network CRNN
          f. Receive the output and send it to the main recurrent neural network MRNN
          g Complete process and Go to B
  b) NO
    Go to A.

Training algorithm of delivery recurrent neural network DRNN:
  a) Check for Brake status,
    i) Normal—Pressure applied
      1. Start recording data
      2. Signal Processing
      3. Cutting the data into useful pieces
      4. Create necessary additional features
      5. Prepare signals and calculated features for input to the delivery recurrent neural network DRNN
      6. Input to the delivery recurrent neural network DRNN
      7. Receive the output and send it to the main recurrent neural network MRNN
      8. Complete process and Go to a
    ii) Anti-lock braking system (ABS) Mode activated
      1. Start recording data
      2. Signal Processing
      3. Cutting the data into useful pieces
      4. Create necessary additional features
      5. Prepare signals and calculated features for input to the delivery recurrent neural network DRNN
      6. Input to the delivery recurrent neural network DRNN
      7. Receive the output and send it to the main recurrent neural network MRNN
      8. Complete process and Go to a
    iii) No Brake application requested
      1. Go to a Training algorithm of supply recurrent neural network SRNN:
  a. Monitoring Status Begins
  b. Time counter reset
  c. Record all supply signals
  d. Temperature signals
  e. Monitor brake applications
  f. Record all vehicle speed and other vehicle signals
  g. Prepare features for the supply recurrent neural network SRNN
  h. Input to the supply recurrent neural network SRNN
  i. Receive the output and send it to the main recurrent neural network MRNN
  j. Go to a.

Figure 3:
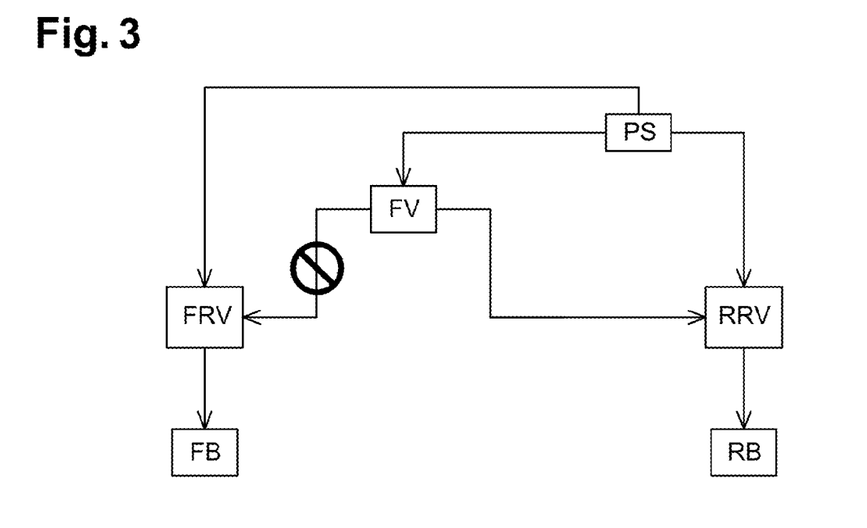
FIG. 3 represents schematically the pneumatic system of a vehicle braking system, with a failure in one of the control lines.

In reference to FIG. 3, an example of a training on the recurrent neural networks is described with some more detail hereinafter.

In the training phase, a kink, for example, is intentionally made on the control lines, successively and independently on 3 different locations, for example one kink mid-way from the two ends of the control line, then another kink close to the foot valve FV, and then another kink close to the front relay valve FRV. Separately and independently for each of the 3 different locations, the control input parameters are collected from the control sensors from the control pneumatics subsystem, during a second period of time triggered by a foot pedal actuation, and fed as input to the control recurrent neural network CRNN, whereas the control output parameter of the control recurrent neural network CRNN is manually labelled according to each case of successive kink location, such as "Kink close to FRV in Front", "Kink close to FV in Front", "Kink midway in Front". During another second period of time triggered by a foot pedal actuation, some other control input parameters collected from the control sensors on the same control pneumatics subsystem, with no kink, will also be fed to the control recurrent neural network CRNN, and the control output parameter of the control recurrent neural network CRNN is then labelled manually with a "normal working" label, for example.

Furthermore, some other control input parameters collected, during another second period of time triggered by a foot pedal actuation, from the control sensors on the same control pneumatics subsystem, with different kink severities, for example rated from 0 to 5, such as 0 being minor kink to 5 being major kink, and the control output parameter of the control recurrent neural network CRNN is being manually labelled according to the severity of the kink.

Still furthermore, other types of fault are considered during the training phase of the control recurrent neural network CRNN: for example, the fault may not only be a kink, but also an open line, a loose fitting or a damage. Each one of these specific fault cases also have different severities. As described before, for each one of these different specific fault cases, control input parameters are collected, during a particular second period of time triggered by a foot pedal actuation, from the control sensors of the control pneumatics subsystem, and fed as input to control recurrent neural network CRNN.

Figure 4:
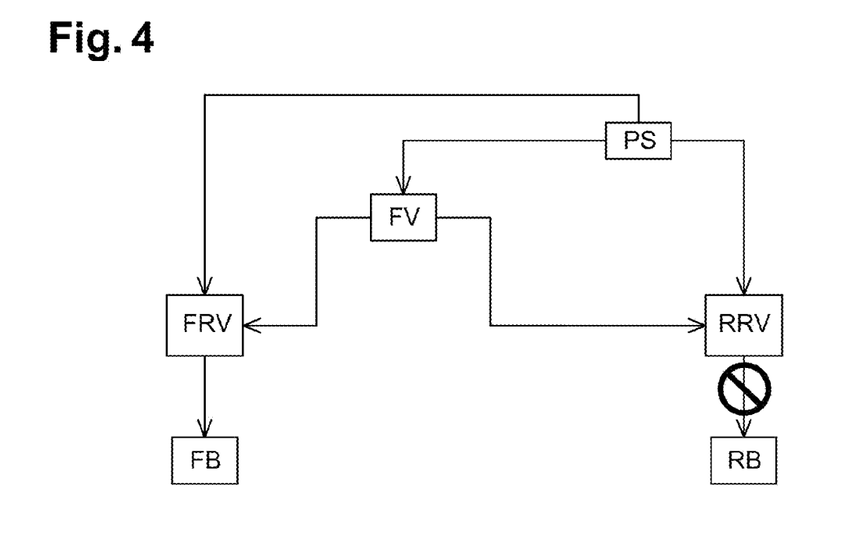
FIG. 4 represents schematically the pneumatic system of a vehicle braking system, with a failure in one of the delivery lines.

In reference to FIG. 4, a loose fitting is intentionally placed, during the training phase of the delivery recurrent neural network DRNN, on a connection of the rear delivery lines RDL with a rear relay valve RRV, with some specified level of severity, respectively 4, and 3; similarly, the delivery output parameter of the delivery recurrent neural network DRNN will be manually labelled respectively as "loose fitting in RRV"; severity=4 , "Loose Fitting in RB"; severity =3, when the delivery input parameters, collected during a third period of time triggered by the actuation of the foot pedal or by an actuation electronically requested, from the delivery sensors of the delivery pneumatics subsystem, are fed as input to the delivery recurrent neural network DRNN.

Figure 5:
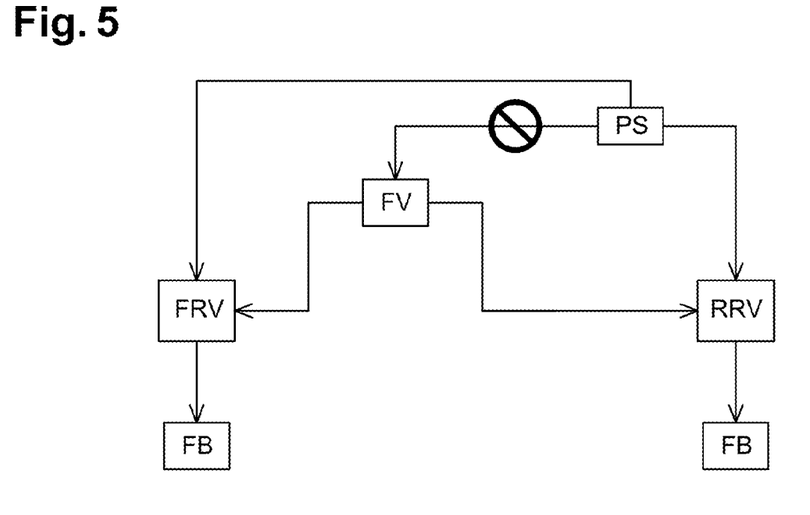
FIG. 5 represents schematically the pneumatic system of a vehicle braking system, with a failure in one of the supply lines.

In reference to FIG. 5, an open line is intentionally placed, during the training phase of the supply recurrent neural network SRNN, on the supply line FVSL configured to supply the control valve FV; this open line will generate no pressure when the brakes are applied. Accordingly, the supply input parameters collected, during a first period of time, with the open line intentionally placed, will be fed as input to the supply recurrent neural network SRNN, and the supply output of the supply recurrent neural network SRNN will be manually labelled according to "Open Supply Line 1"; Severity=4 , and/or "Open Supply line 3"; severity=1", depending on the supply line considered and the severity considered.

Thus, the inside parameters of the recurrent neural networks CRNN, DRNN, SRNN, will learn from the different test situations used during the training and be adapted to predict new occurrences of similar situations.

During the training phase, the supply recurrent neural networks SRNN, and control the recurrent neural networks CRNN, and the delivery recurrent neural networks DRNN, will be trained first; the main recurrent neural network MRNN will be trained only after the three other recurrent neural networks CRNN, DRNN, SRNN, are trained. At the end of the training of the recurrent neural networks CRNN, DRNN, SRNN, a fault in the supply lines, for example, may also generate prediction of a fault, for example a kink, in the delivery lines, since the pressure signals look "not normal" in the delivery lines also due to actual loose fitting on the supply lines. The training of the main recurrent neural network MRNN results in the main recurrent neural network MRNN being capable of discriminating between the loose fitting on the supply lines and the kink in the delivery lines. So, the main recurrent neural network MRNN will be trained, by collecting the fault and severity from both recurrent neural networks, i.e. in this particular case the supply recurrent neural networks SRNN, and the delivery recurrent neural networks DRNN, as well as the supply input parameters and delivery input parameters that are fed as input to both recurrent neural networks SRNN, DRNN; thus, this input fed into to the main recurrent neural network MRNN, comprises the inputs of the trained supply recurrent neural network SRNN, collected during a first period of time, and of the trained delivery recurrent neural network DRNN, collected during a third period of time triggered by foot pedal actuation or by an actuation electronically requested, and the outputs of the trained supply recurrent neural network SRNN, and of the trained supply recurrent neural networks DRNN; this input fed into to the main recurrent neural network MRNN, is manually labelled into the actual fault, to teach the main recurrent neural network MRNN to predict that it is, for example, only a loose fitting and not a delivery line kink. More generally, for any actual fault situation of the pneumatics system which results in a wrong prediction from one of the three trained recurrent neural networks CRNN, DRNN, SRNN, based on a given set of input parameters, the predicted outputs of the three trained recurrent neural networks CRNN, DRNN, SRNN, and the given set of input parameters, collected from the respective control sensors, delivery sensors, supply sensors, respectively during a second period of time, a third period of time, a first period of time, is input to the main recurrent neural network MRNN and manually labeled so that it learns how to predict which is the actual fault to predict, which is the wrong fault to eliminate.

Training of the supply recurrent neural networks SRNN, i.e., for supply lines, is done on normal conditions with and without brake applications, i.e. during first periods time with and without activating the foot brake pedal, or with and without electronically activating the electronically controlled relay valves.

Training of the control recurrent neural networks CRNN, i.e., for control lines, is done during second period of times only on brake applications to pedal, i.e. only when activating the foot brake pedal.

Training of the delivery recurrent neural networks DRNN, i.e., for delivery lines, is done during third period of times with brake applications through pedal or electronically requested, i.e. with activating the foot brake pedal, or with electronically activating the electronically controlled relay valves.

During this completed training phase, the inside parameters of the recurrent neural networks CRNN, DRNN, SRNN, MRNN are automatically adjusted so that the recurrent neural networks CRNN, DRNN, SRNN, MRNN are configured, after the completed training phase to predict a kink, when a kink is present, or some other kind of fault, if said other kind of fault is present, according to one of the severities learned during the training phase, when they are fed, during the production phase, with new inputs from the sensors of the pneumatics system PNS corresponding, even with some small variations, to one of the taught situations.

Figure 6:
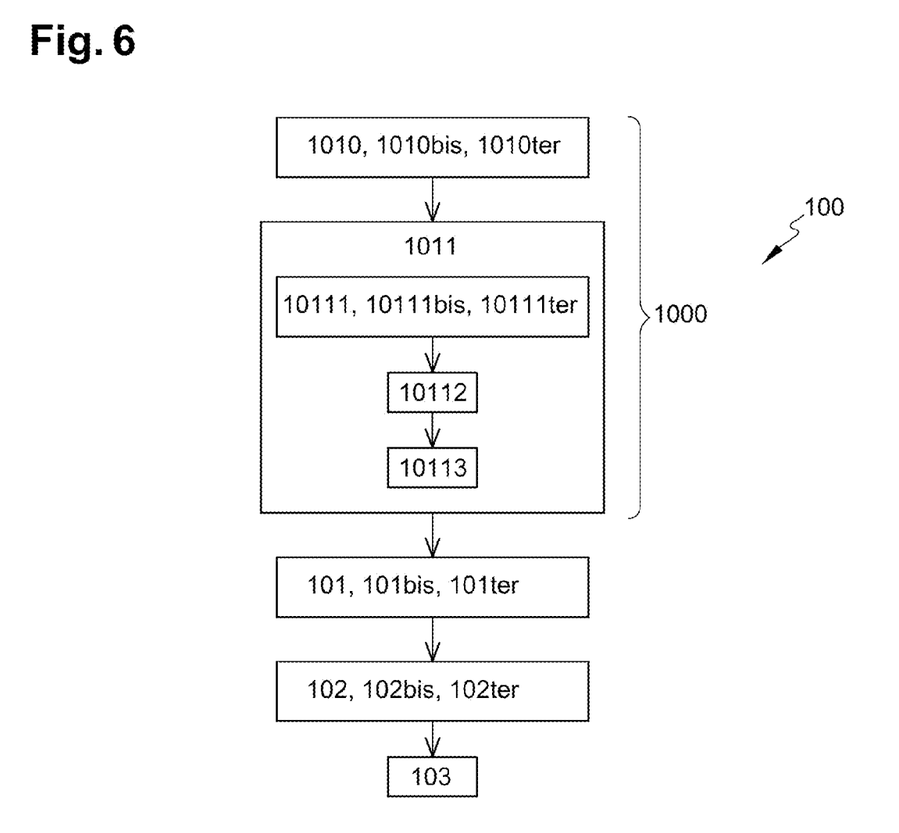
FIG. 6 represents schematically the sequence diagram of the steps of the method according to an embodiment of the invention.

In reference to FIG. 6, the sequence of the steps of the method 100, according to an embodiment of the invention, is further described.

In a production phase, the method 100 comprises the following steps:
  collect 101, during a first period of time, supply parameters from the supply sensors;
  provide 102 the supply parameters as input to the trained supply recurrent neural network SRNN to get a supply output from the supply recurrent neural network SRNN;
  collect 101bis, during a second period of time, control parameters from the control sensors, the second period of time being during a brake application requested by pedal;
  provide 102bis the control parameters as input to the trained control recurrent neural network CRNN to get a control output from the control recurrent neural network SRNN;
  collect 101ter, during a third period of time, delivery parameters from the delivery sensors, the third period of time being during a brake application requested by pedal or requested electronically;
  provide 102ter the delivery parameters as input to the trained delivery recurrent neural network SRNN to get a delivery output from the delivery recurrent neural network SRNN;
  provide, 103 as input to the trained main recurrent neural network MRNN, the supply parameters, the control parameters, the delivery parameters, the supply output, the control output, and the delivery output, to get a main output indicative of a pneumatic system health parameter PHP, the pneumatic system health parameter PHP being indicative of a presence and a severity, or of an absence, of a failure in one of the supply pneumatic subsystem, or the control pneumatic subsystem, or the delivery pneumatic subsystem of the pneumatic system PNS.

In a training phase 1000, the method 100 comprises the following steps:
  train 1010 the untrained supply recurrent neural network SRNN to provide the trained supply recurrent neural network SRNN, the training of the untrained supply recurrent neural network SRNN comprising providing as input to the untrained supply recurrent neural network SRNN at least one set of supply input parameters collected during a first training time period and manually labelling an supply output parameter according to a presence and a severity, or to an absence, of an actual failure in the supply pneumatic subsystem;
  train 1010bis the untrained control recurrent neural network CRNN to provide the trained control recurrent neural network CRNN, the training of the untrained control recurrent neural network CRNN comprising providing as input to the untrained control recurrent neural network CRNN at least one set of control input parameters collected during a second training time period, and manually labelling a control output parameter according to a presence and a severity, or to an absence, of an actual failure in the control pneumatic subsystem, said second training time period being during a brake application requested by pedal;

train 1010ter the untrained delivery recurrent neural network DRNN to provide the trained delivery recurrent neural network DRNN, the training of the untrained delivery recurrent neural network DRNN comprising providing as input to the untrained delivery recurrent neural network CRNN at least one set of delivery input parameters collected during a third training time period, and manually labelling a delivery output parameter according to a presence and a severity, or to an absence, of an actual failure in the delivery pneumatic subsystem, said third training period of time being during a brake application requested by pedal or requested electronically;

train 1011 the untrained main recurrent neural network MRNN to provide the trained main recurrent neural network MRNN, the training of the untrained main recurrent neural network (MRNN) comprising the following steps:

provide 10111 at least one other set of supply input parameters collected during another first training time period to the trained supply recurrent neural network SRNN, and provide 10111bis at least one other set of control input parameters collected during another second training time period to the trained control recurrent neural network CRNN, the other second training time period being during another brake application requested by pedal, and provide 10111ter at least one other set of delivery input parameters collected during another third training time period to the trained delivery recurrent neural network DRNN, the other third training time period being during another brake application requested by pedal or requested electronically;

provide 10112 as input to the untrained main recurrent neural network MRNN:

the at least one other set of supply input parameters, and the at least one other set of control input parameters, and the at least one other set of delivery input parameters, and a supply output of the trained supply recurrent neural network SRNN, and a control output of the trained control recurrent neural network CRNN, and a delivery output of the trained delivery recurrent neural network DRNN, and manually 10113 label an main output parameter of the untrained main recurrent neural network MRNN according to a presence and a severity, or to an absence, of an actual failure in one of the supply pneumatic subsystem, and/or the control pneumatic subsystem and/or the delivery pneumatic subsystem.

According to an aspect, the invention relates to a vehicle comprising a pneumatic system PNS, and an electronic control unit ECU, the pneumatic system PNS comprising:

a supply pneumatic subsystem comprising supply lines FSL, RSL, FVSL, at least one supply line being in fluid communication with a pressure source PS on one end and with a control valve CV on another end, other supply lines being in fluid communication with the pressure source PS on one end and with a relay valve FRV, RRV on another end;

a control pneumatic subsystem comprising control lines CL, each control line being in fluid communication with the control valve CV on one end and with one of the relay valves FRV, RRV;

a delivery pneumatic subsystem comprising delivery lines FDL, RDL, each delivery line being in fluid communication with one of the relay valves FRV, RRV on one end, and with a brake FB, RB on the other end;—the electronic control unit ECU being configured to collect a set of input parameters from sensors via a communication bus of the vehicle, and configured to implement a trained supply recurrent neural network SRNN, a trained control recurrent neural network CRNN, a trained delivery recurrent neural network DRNN, and a trained main recurrent neural network MRNN the input parameters comprising supply input parameters relative to the supply pneumatic subsystem, control input parameters relative to the control pneumatic subsystem, and delivery input parameters relative to, the delivery pneumatic subsystem;

the sensors comprising:

supply sensors, configured to collect supply input parameters;

control sensors, configured to collect control input parameters;

delivery sensors, configured to collect delivery input parameters;

the electronic control unit ECU being configured to implement the method according to any of the preceding claims.

The invention claimed is:

1. A method for detecting a failure in a pneumatic system of a vehicle, the pneumatic system comprising:

a supply pneumatic subsystem comprising supply lines, at least one supply line being in fluid communication with a pressure source on one end and with a control valve on another end, other supply lines being in fluid communication with the pressure source on one end and with a relay valve on another end;

a control pneumatic subsystem comprising control lines, each control line being in fluid communication with the control valve on one end and with one of the relay valves;

a delivery pneumatic subsystem comprising delivery lines, each delivery line being in fluid communication with one of the relay valves on one end, and with a brake on the other end;

wherein the vehicle comprises an electronic control unit, configured to collect a set of input parameters from sensors via a communication bus of the vehicle, and configured to implement a trained supply recurrent neural network, a trained control recurrent neural network, a trained delivery recurrent neural network, and a trained main recurrent neural network;

wherein the input parameters comprise supply input parameters relative to the supply pneumatic subsystem, control input parameters relative to the control pneumatic subsystem, and delivery input parameters relative to, the delivery pneumatic subsystem;

wherein the sensors comprise:

supply sensors, configured to collect supply input parameters;

control sensors, configured to collect control input parameters; and delivery sensors, configured to collect delivery input parameters; and wherein the method comprises the following steps:
collecting, during a first period of time, supply parameters from the supply sensors;
providing the supply parameters as input to the trained supply recurrent neural network to get a supply output from the supply recurrent neural network;
collecting, during a second period of time, control parameters from the control sensors, the second period of time being during a brake application requested by pedal;
providing the control parameters as input to the trained control recurrent neural network to get a control output from the control recurrent neural network;
collecting, during a third period of time, delivery parameters from the delivery sensors, the third period of time being during a brake application requested by pedal or requested electronically;
providing the delivery parameters as input to the trained delivery recurrent neural network to get a delivery output from the delivery recurrent neural network; and
providing, as input to the trained main recurrent neural network, the supply parameters, the control parameters, the delivery parameters, the supply output, the control output, and the delivery output, to get a main output indicative of a pneumatic system health parameter, the pneumatic system health parameter being indicative of a presence and a severity, or of an absence, of a failure in one of the supply pneumatic subsystem, or the control pneumatic subsystem, or the delivery pneumatic subsystem of the pneumatic system.

2. The method of claim 1, wherein the set of input parameters comprise at least:
a brake pedal position measured by a pedal position sensor;
an ambient temperature measured by an ambient temperature sensor placed on the vehicle;
a delivery pressure measured by a delivery pressure sensor in delivery lines;
a control pressure measured by a control pressure sensor in control lines;
a supply pressure measured by a supply pressure sensor in supply lines;
an air pressure measured in a air pressure sensor in an air pressure modulator unit;
electronic messages sent on a communication bus to apply brake electronically; and
a compressor status and information.

3. The method of claim 2, wherein the set of input parameters further comprises:
a brake pedal velocity;
suspension information;
load transfer information;
transmission airline information; and
a supply lines temperature in supply lines and/or a delivery lines temperature in delivery lines and/or a control lines temperature in control lines.

4. The method of claim 1, wherein the steps of the method are repeated at least one more time when the pneumatic system health parameter is indicative of the presence of a failure, in order to double-check an occurrence of the failure.

5. The method of claim 1, further comprising a training phase of an untrained supply recurrent neural network, an untrained control recurrent neural network, a untrained delivery recurrent neural network, and an untrained main recurrent neural network, to provide the trained supply recurrent neural network, the trained control recurrent neural network, the trained delivery recurrent neural network, and the trained main recurrent neural network;
the training phase comprising the following steps:
training the untrained supply recurrent neural network to provide the trained supply recurrent neural network, the training of the untrained supply recurrent neural network comprising providing as input to the untrained supply recurrent neural network at least one set of supply input parameters collected during a first training time period and manually labelling an supply output parameter according to a presence and a severity, or to an absence, of an actual failure in the supply pneumatic subsystem;
training the untrained control recurrent neural network to provide the trained control recurrent neural network, the training of the untrained control recurrent neural network comprising providing as input to the untrained control recurrent neural network at least one set of control input parameters collected during a second training time period, and manually labelling a control output parameter according to a presence and a severity, or to an absence, of an actual failure in the control pneumatic subsystem, said second training time period being during a brake application requested by pedal;
training the untrained delivery recurrent neural network to provide the trained delivery recurrent neural network, the training of the untrained delivery recurrent neural network comprising providing as input to the untrained delivery recurrent neural network at least one set of delivery input parameters collected during a third training time period, and manually labelling a delivery output parameter according to a presence and a severity, or to an absence, of an actual failure in the delivery pneumatic subsystem, said third training period of time being during a brake application requested by pedal or requested electronically; and
training the untrained main recurrent neural network to provide the trained main recurrent neural network;
the training of the untrained main recurrent neural network comprising the following steps:
providing at least one other set of supply input parameters collected during another first training time period to the trained supply recurrent neural network;
providing at least one other set of control input parameters collected during another second training time period to the trained control recurrent neural network, the other second training time period being during another brake application requested by pedal; and
providing at least one other set of delivery input parameters collected during another third training time period to the trained delivery recurrent neural network, the other third training time period being during another brake application requested by pedal or requested electronically;
providing as input to the untrained main recurrent neural network:
the at least one other set of supply input parameters;
the at least one other set of control input parameters;
the at least one other set of delivery input parameters;
a supply output of the trained supply recurrent neural network;

a control output of the trained control recurrent neural network; and a delivery output of the trained delivery recurrent neural network, and manually labeling a main output parameter of the untrained main recurrent neural network according to a presence and a severity, or to an absence, of an actual failure in one of the supply pneumatic subsystem, and/or the control pneumatic subsystem and/or the delivery pneumatic subsystem.

6. A vehicle comprising a pneumatic system and an electronic control unit, the pneumatic system comprising:

a supply pneumatic subsystem comprising supply lines, at least one supply line being in fluid communication with a pressure source on one end and with a control valve on another end, other supply lines being in fluid communication with the pressure source on one end and with a relay valve on another end;

a control pneumatic subsystem comprising control lines, each control line being in fluid communication with the control valve on one end and with one of the relay valves; and a delivery pneumatic subsystem comprising delivery lines, each delivery line being in fluid communication with one of the relay valves on one end, and with a brake on the other end;—the electronic control unit being configured to collect a set of input parameters from sensors via a communication bus of the vehicle, and configured to implement a trained supply recurrent neural network, a trained control recurrent neural network, a trained delivery recurrent neural network, and a trained main recurrent neural network;

wherein the input parameters comprise supply input parameters relative to the supply pneumatic subsystem, control input parameters relative to the control pneumatic subsystem, and delivery input parameters relative to, the delivery pneumatic subsystem;

wherein the sensors comprise:
 supply sensors, configured to collect supply input parameters;
 control sensors, configured to collect control input parameters; and
 delivery sensors, configured to collect delivery input parameters; and wherein the electronic control unit is configured to implement the method of claim 1.

* * * * *